United States Patent [19]

Jaquith

[11] 3,977,362

[45] Aug. 31, 1976

[54] FLUID MOVEMENT CONTROL MECHANISM

[75] Inventor: Burton Kent Jaquith, Fort Lauderdale, Fla.

[73] Assignee: Technical Industries, Inc., Fort Lauderdale, Fla.

[22] Filed: Apr. 18, 1975

[21] Appl. No.: 569,297

[52] U.S. Cl. ............................ 119/14.14; 119/14.17
[51] Int. Cl.² .......................................... A01J 5/04
[58] Field of Search ......... 119/14.17, 14.08, 14.14; 73/217, 219; 177/94

[56] References Cited
UNITED STATES PATENTS

| | | | |
|---|---|---|---|
| 2,998,772 | 9/1961 | Jaquith | 119/14.17 X |
| 3,111,113 | 11/1963 | Jaquith | 119/14.17 |
| 3,705,533 | 12/1972 | Kahl et al. | 177/94 |
| 3,738,170 | 6/1973 | Maeshiba | 73/217 |

*Primary Examiner*—Hugh R. Chamblee
*Attorney, Agent, or Firm*—James J. Mullen

[57] ABSTRACT

A conduit feeding system comprising (a) a chute for containing loose feeding material passing therethrough to a discharge opening; (b) a compartmented delivery wheel positioned within said chute for receiving said material into one or more of its compartments to be conveyed thereby toward the discharge opening; (c) a motor in direct driving connection with said delivery wheel; (d) a fluid flow indicating device provided for use with a second conduit system wherein a fluid material is moved and is weighed by a continuous weighing mechanism, whereby when said device is activated by fluid material passage through said second conduit, said device energizes said motor, according to preset circuitry conditions in said device, for rotation of said wheel; and (e) suitable electrically conductive means between said device and said motor.

20 Claims, 25 Drawing Figures

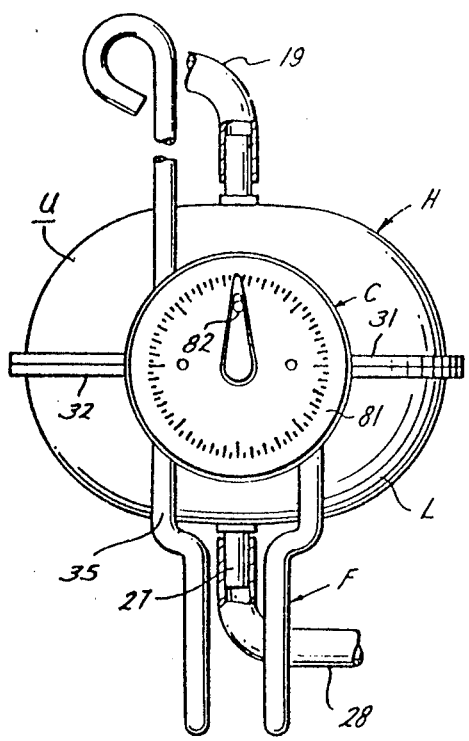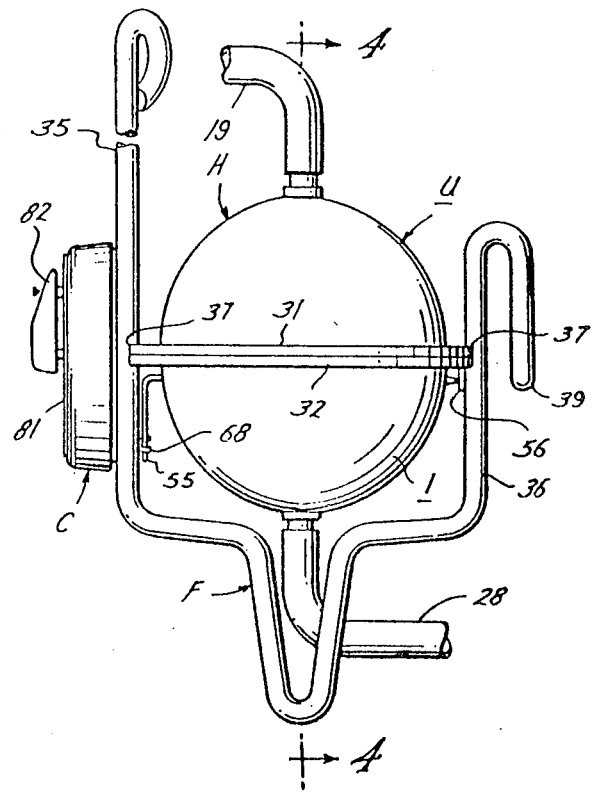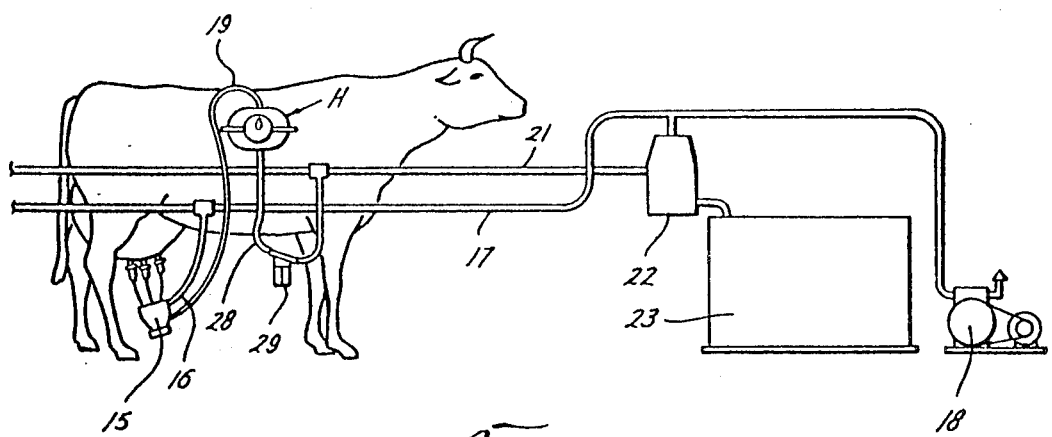

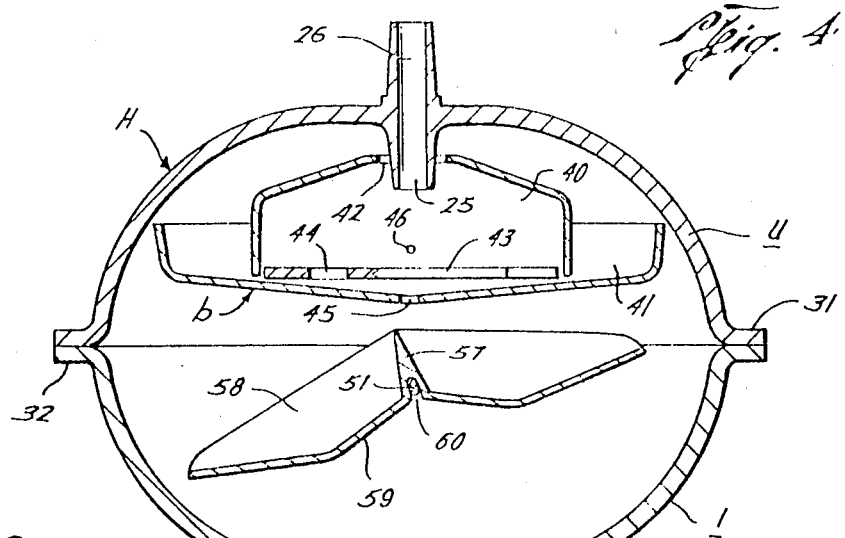
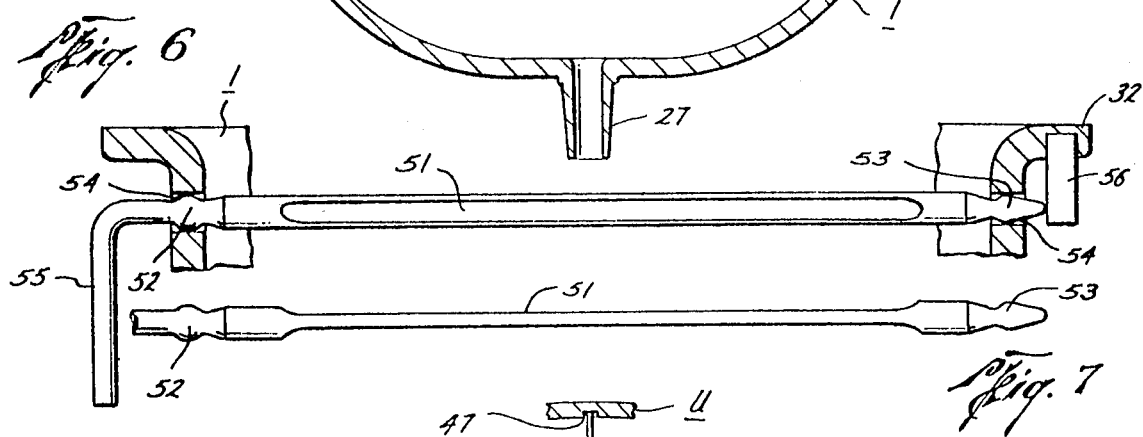
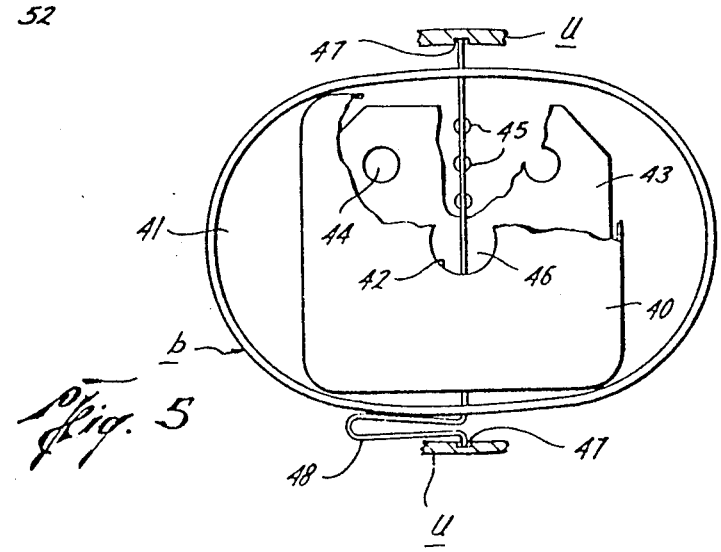

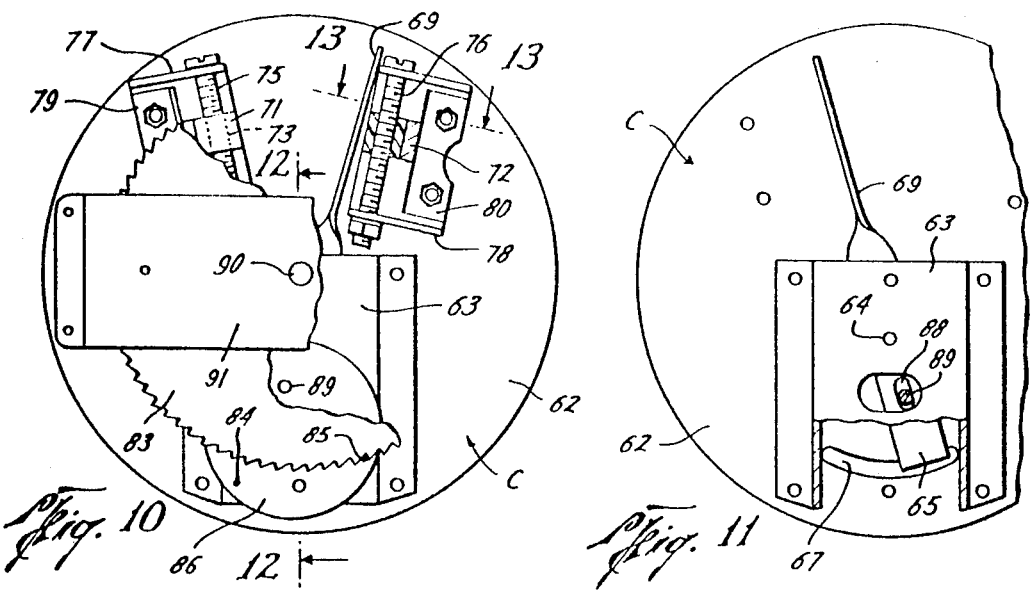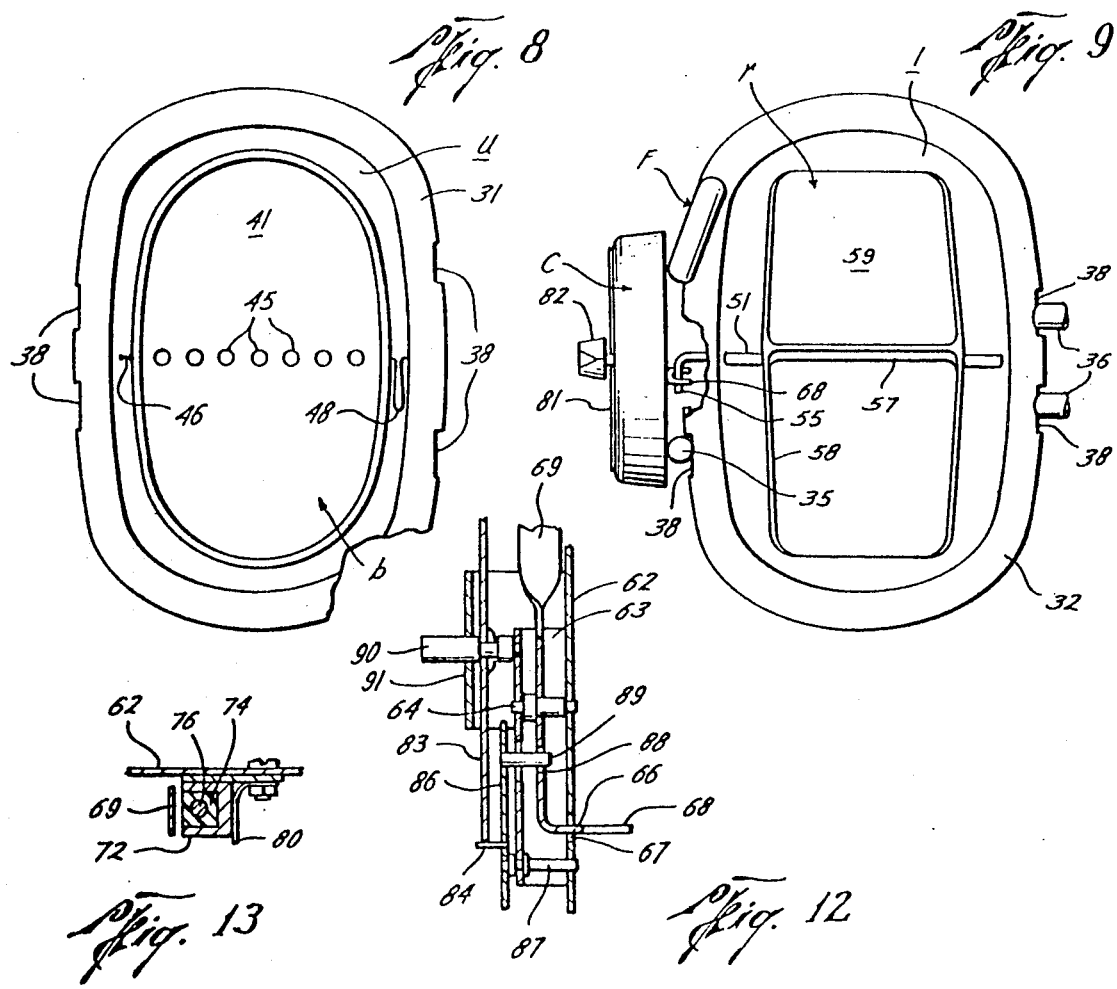

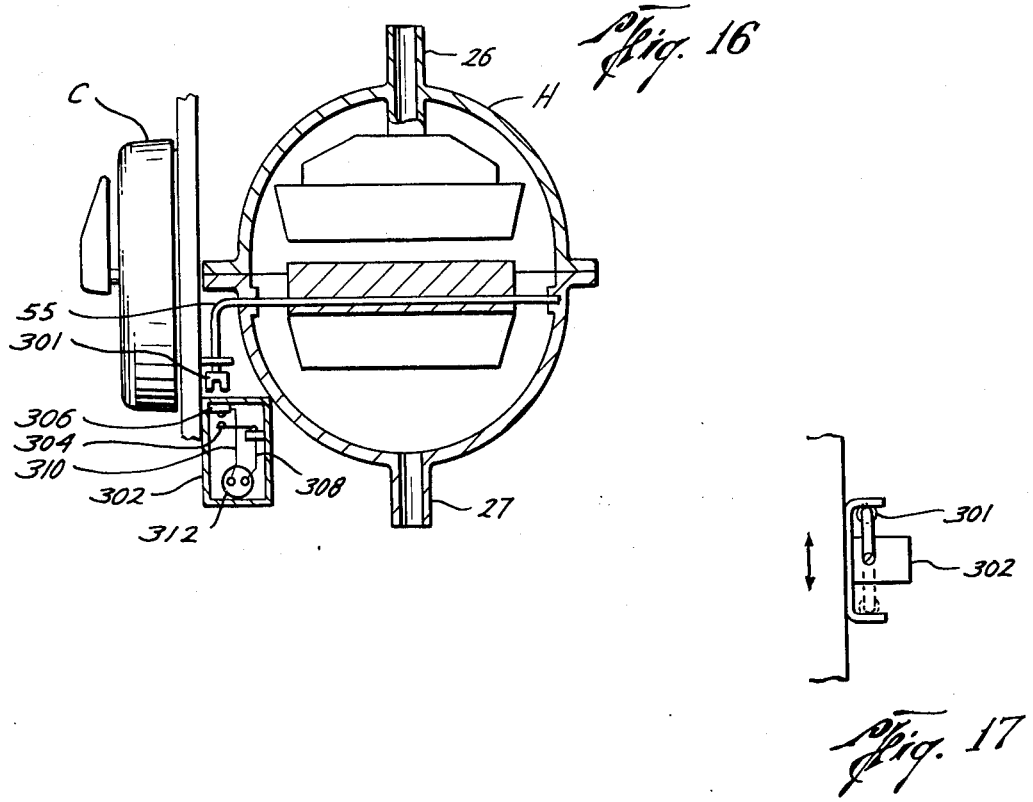
Fig. 16
Fig. 17
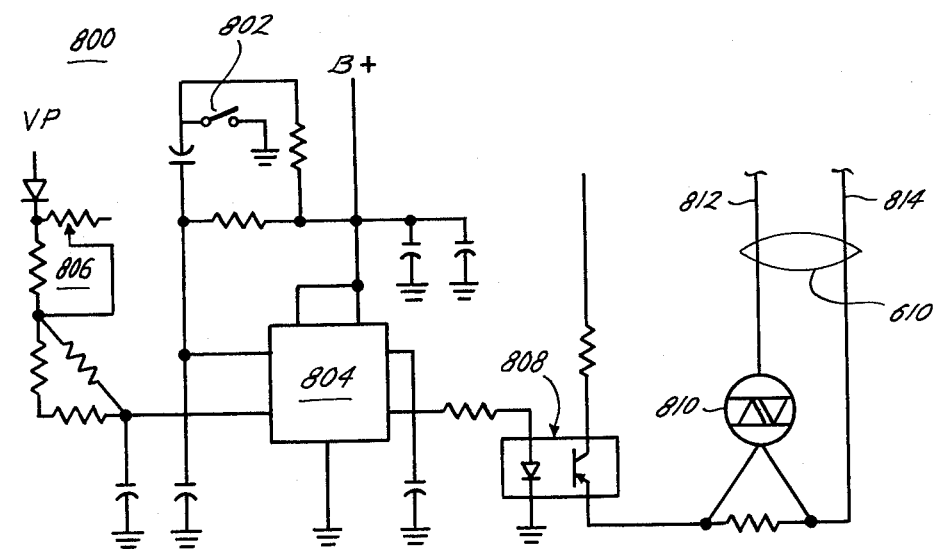
Fig. 18

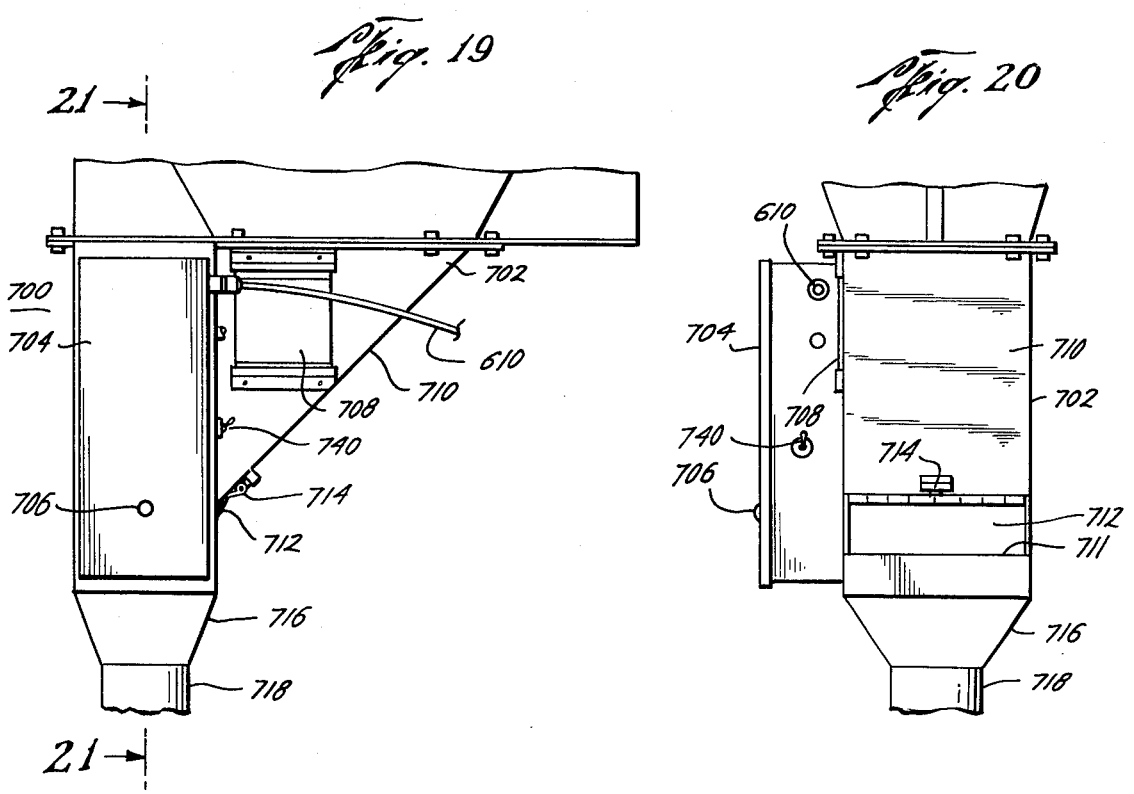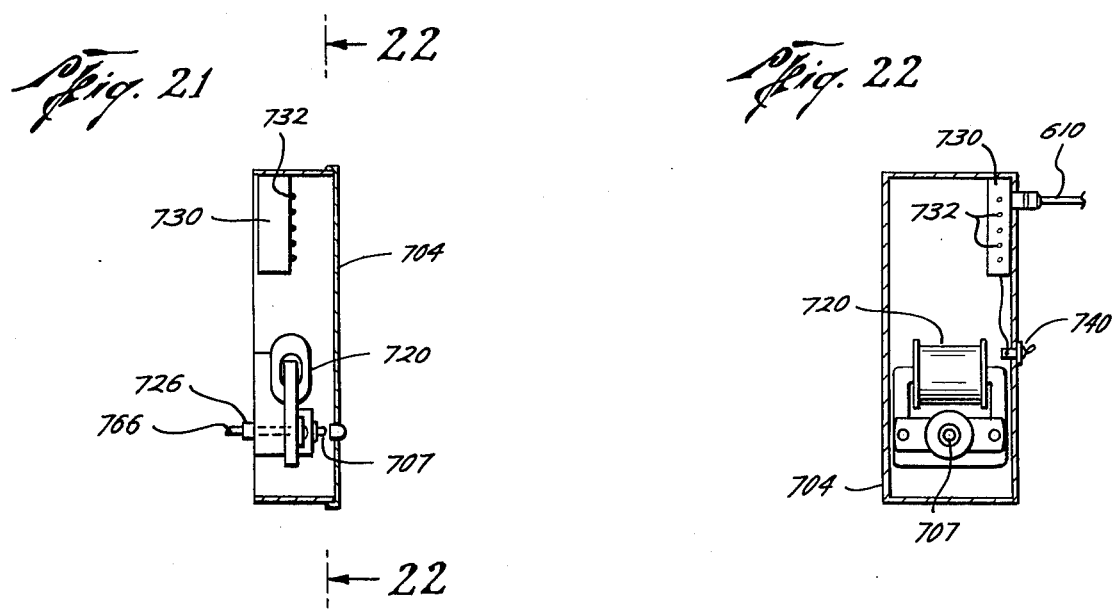

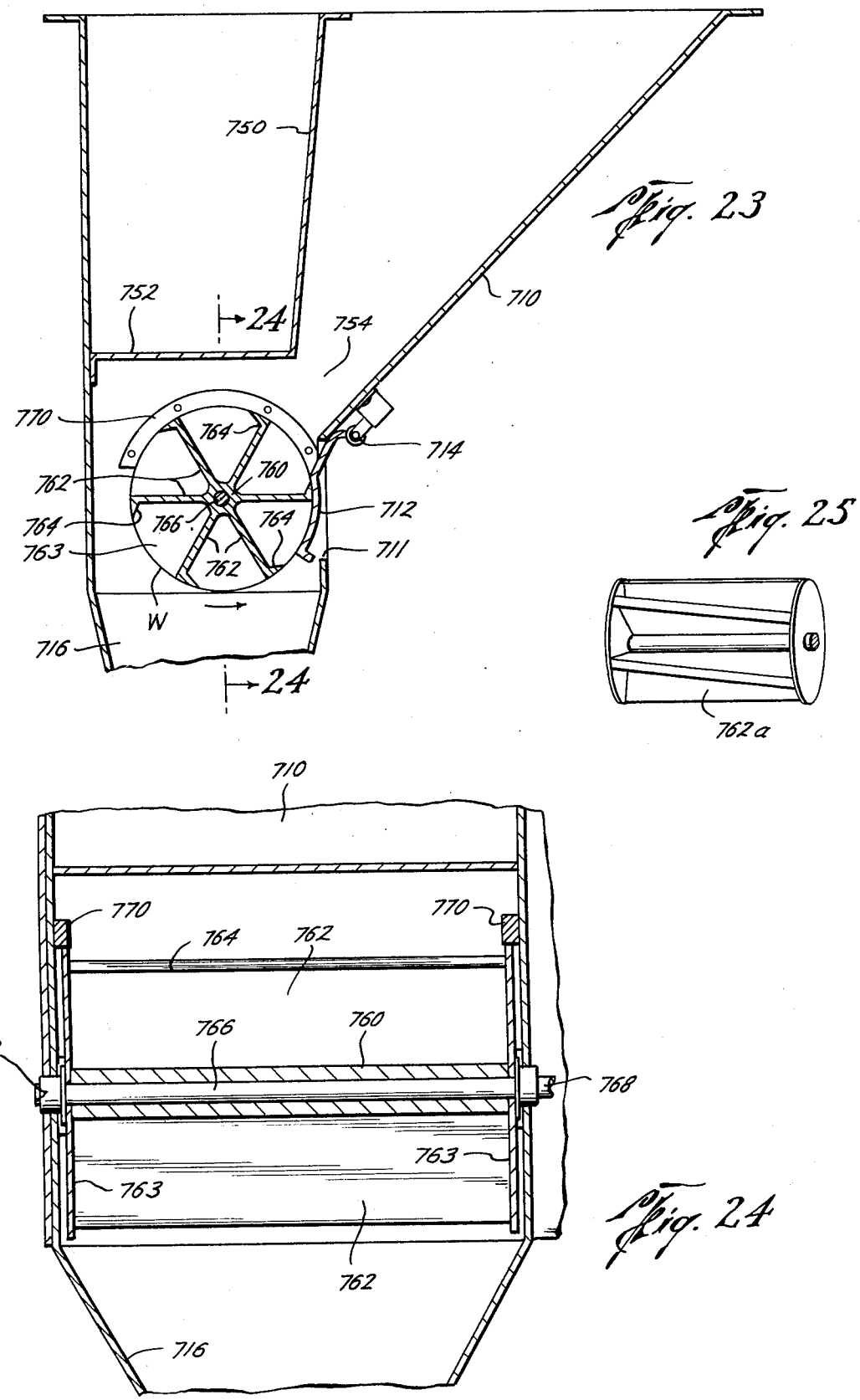

FLUID MOVEMENT CONTROL MECHANISM

This patent application and applicant's patent applications entitled "Temperature Indicating Device for Fluids" U.S. Ser. No. 563,187, filed Mar. 28, 1975, and "Improved Continuous Weighing Mechanism for Fluids," U.S. Ser. No. 563,093, filed Mar. 28, 1975, contain common subject matter and consequently these latter mentioned patent applications, including the drawings therein, should be considered as incorporated herein, in toto, by reference for all intents and purposes.

PRIOR ART

The prior art considered in conjunction with the preparation of this case are as follows: U.S. Pat. No. 1,392,311; U.S. Pat. No. 1,533,796; U.S. Pat. No. 1,649,250; U.S. Pat. No. 2,081,947; U.S. Pat. No. 2,189,213; U.S. Pat. No. 2,555,437; U.S. Pat. No. 2,578,863; U.S. Pat. No. 2,642,837; U.S. Pat. No. 2,661,122; U.S. Pat. No. 2,738,765; U.S. Pat. No. 2,858,800; U.S. Pat. No. 2,886,000; U.S. Pat. No. 2,888,034; U.S. Pat. No. 2,942,574; U.S. Pat. No. 2,949,883; U.S. Pat. No. 2,966,800; U.S. Pat. No. 2,969,039; U.S. Pat. No. 3,034,688; U.S. Pat. No. 3,111,113; U.S. Pat. No. 3,157,157; U.S. Pat. No. 3,171,385; U.S. Pat. No. 3,246,631; U.S. Pat. No. 3,303,822; U.S. Pat. No. 3,303,823; British Pat. No. 812,017; and German Pat. No. 831,468. All of these publications should be considered as incorporated herein, in toto, by reference for all intents and purposes.

BACKGROUND OF THE INVENTION

The present invention related in general to an improved means for handling flowable material within a conduit system therefor, by separating the material into uniform increments of predetermined amount and advancing all such increments processionally to a point of discharge. It is concerned also with a means and method for utilization of impulses, resulting from conversion of a continuous stream, variable or otherwise, of flowable material into a succession of separated increments thereof, to measure the amount of such material passing through the conduit system therefor and/or control the operation of a feeding mechanism for a second conduit system through which flowable material, derived from a different source, is adapted to be processionally advanced in the form of separated increments. More specifically, the present invention related to an improved fluid movement control mechanism and further relates to the combination of such control mechanism (associated with one conduit system) with an improved continuous weighing mechanism for fluids (associated with a second conduit system).

In conjunction with the description contained herein, regarding the fluids passing through said weighing mechanism, it is to be understood that this facet of the present invention has applicability to numerous types of materials in motion including liquids ranging widely in viscosity and characteristics, granular substances capable of fluid motion and various combinations thereof. However, as a specific example, the subsequent description will be concerned with milk in its flow from a cow through a conduit system which includes a milking machine, a weighing mechanism for said fluids, a collection container, a vacuum pump which exerts a subatmospheric pressure in the overall system, and feed supply system for said cow including the improved fluid movement control mechanism.

While the present invention may find useful application in various industries engaged in handling flowable materials of many different kinds, it has been designed for and successfully used in the dairy industry to supply feed to production cows concurrently with milking operations, the quantity of such feed being adjustable relative to the milk yield, in a desired ratio, in each case. Stated differently, the feed supplied to each cow is in a quantity that is in direct proportion to her concurrent milk production. By adopting a basic ratio of feed to milk production, with provision for variations to meet special conditions, a large number of producing cows may be assured of receiving feed in an amount best suited for the requirements of each individual cow, concurrently with each milking operation, and with a minimum of effort and wastage.

The word "feed" as used herein, includes food concentrates, grain supplements, rations, etc. — all loose material which is flowable through a conduit system to be handled mechanically therein. Likewise, "fluid" is to be construed as any material, liquid, granular, loose feed, or otherwise, which is flowable or in a flowable state, so as to be subject to treatment by the several agencies in the manner hereinafter noted. The term "continuous" or its equivalent as used herein in reference to flowing material, is to be understood as not limited to, but including, a stream whose movement is somewhat variable as to velocity and quantity, as in the case of milk proceeding from the udder of a cow through a conduit therefor to a desired destination.

The term "weighing mechanism" as used herein, includes volumetric devices for monitoring fluid throughout and which ultimately is equated to weight, e.g. pounds or pounds per minute.

Since the output of producing cows is widely variable, the amount of feed supplied to each individual cow should also vary somewhat correspondingly, otherwise the amount may be too much or too little. The simplest way is to relate the feed input to the milk output according to some established basic ratio, however, prior to the inventive concept set forth in U.S. Pat. No. 3,111,113, issued Nov. 19, 1963, this has not been successfully done by automatic means. The present invention now constitutes an improvement over the invention set forth in U.S. Pat. No. 3,111,113.

Regarding the milking of animals such as cows, the prior art U.S. Pat. No. 3,111,113 has recognized this problem of establishing a feed input to milk output ratio and the need for refined correlation thereof. However, one of the disadvantages of the prior art device which has been suggested to solve this problem has been that said device is based upon complex electromechanical apparatus such as shown in FIGS. 3, 4, 6, 9, 10 and 11 in U.S. Pat. No. 3,111,113. Under these circumstances, however, there are numerous disadvantages. Consequently, it can thus be seen that there is a need in the art for a simplified mechanism which in this case constitutes an improvement over U.S. Pat. No. 3,111,113 and which can be used in combination with a continuous weighing mechanism for fluids in order to overcome the disadvantages heretofore set forth.

Accordingly, it is one object of the present invention to provide an improved fluid movement control mechanism which is simple in construction but is highly effective when utilized, for example, in a conduit feed system.

Another object of the present invention is to provide in combination with said improved fluid movement control mechanism, a fluid flow indicating device used in a second conduit system and which both systems are interconnected therebetween by suitable electrically conductive means.

A salient object of the present invention is to provide a milk collection system wherein an animal being milked is concurrently being fed and there is established a milk out-put to feed in-put relationship by the combination of a fluid flow indicating device associated with said milk out-put system as in improved movement control mechanism associated with the feed in-put system.

A further object of the present invention is to provide an apparatus for the constant monitoring of an animal's fluid out put during a milking period and by suitable electrical circuitry activate and control the feed in-put to the animal during said milking operation.

A still further object of the present invention is to provide a highly sophisticated milking operation and feeding operation for utilization with animals such as cows in order to effect a milk out-put to feed in-put ratio for each animal being milked.

These and other objects of the present invention will be readily apparent from the subsequent description including the claims and drawings.

BRIEF DESCRIPTION OF THE INVENTION

The disadvantages heretofore mentioned in conjunction with the prior art are overcome by the present invention which comprises in one part a fluid flow indicating device and in another part the combination of the fluid flow indicating device and a continuous weighing mechanism for fluids, preferably a gravimetric operated apparatus, and in another part the combination of the fluid flow indicating device and an improved fluid movement control mechanism. Another facet of the present invention provides for the combination of the fluid flow indicating device, the continuous weighing mechanism and the improved fluid movement control mechanism.

The fluid flow indicating device in general comprises a magnet which is detachably maintained on the rocker shaft (which supports the fluid receiver) of said weighing mechanism. A magnetic field proximity switch, such as a "reed" switch, is connected with said weighing mechanism and is in electromagnetic relationship with said magnet. When the fluid receiver is filled, the shaft rotates and thus causes the magnet to pass over the surface of the switch. The switch is then activated and a signal is transmitted through a shielded connector cord. The switch is self-contained with a suitable connector cord on the end thereof.

It is to be understood that while the fluid flow indicating device discloses the utilization of a magnetic field proximity switch, other equivalent devices such as a stroboscope can be used to indicate the movement of the rocker shaft.

The shielded connector cord terminates in a plug assembly on the opposite end from said switch. This facet is an essential part of the device in that the complete disassembly of the milk collection system or portions thereof for cleaning is necessary for sanitation purposes and therefore each device must be independent since as a practical matter there is no assurance that a specific device will be interconnected with a specific control module (herein defined) or recording device in subsequent milkings.

Thee opposite end of the switch terminates as previously mentioned with a connector which in turn is adapted to be fitted into a control box in a female-male type (receptical-plug) relation. Within the control box, a "mother" board is adapted to connect a solid state electronic timing circuit (control module). The control module is so designed in circuitry that a precise timing sequence, actuated by the reed switch, can be detected and according to the preset circuitry conditions the AC lines can be actuated and thus energizes a motor in the improved fluid movement control mechanism associated with a second conduit system, i.e. a conduit feeding system.

It has been found that the fluid flow indicating device used in conjunction and in combination with the continuous weighing mechanism provides an extremely accurate means of detecting the fluid output of animals and thus ultimately permits the effectuation of a substantially precise fluid (milk) output to feed input ratio.

The conduit feeding system comprises (a) a chute for containing loose feeding material passing therethrough to a discharge opening; (b) a compartmented delivery wheel positioned within said chute for receiving said material into one or more of its compartments to be conveyed thereby toward the discharge opening; (c) a motor in direct driving connection with said delivery wheel; (d) the fluid flow indicating device heretofore described and which energizes said motor, according to preset circuitry conditions in said device, for rotation of said wheel; and (e) suitable electrically conductive means between said device and said motor.

Another facet of the present invention relates to the utilization of the control box with a "mother" board contained therein to be suitably adapted whereby the "mother" board holds both the control module (herein sometimes referred to as fluid/feed ratio) which is associated with the improved fluid movement control mechanism and also a second control module (herein sometimes referred to as FLO-SENSOR module) which functions in a manner described in applicant's co-pending application Ser. No. 563,093 filed Mar. 28, 1975, and entitled "Improved Continuous Weighing Mechanism For Fluids."

In this part of the present invention the "mother" board is a solid state circuit board which is suitably adapted to receive the signal from the fluid flow indicating device and transmit this signal concurrently to both the FLO-SENSOR control module and the fluid/feed ratio control module both of which are in parallel. Thus, it can be seen that the herein described magnetic field proximity switch jointly activates, through the two control modules described above and upon preset circuitry conditions independent of each other, either a warning light or other device via the FLO-SENSOR control module, and the motor in the conduit feeding system via the "ratio" control module.

IN THE DRAWINGS

The present invention is more clearly understood from the subsequent detailed description taken in conjunction with the accompanying drawings which illustrate as a specific example embodiment of this invention as designed for and applied to a typical closed fluid (e.g. milk) conduit system starting with the claw at the udder of a cow and ending with a receptical wherein milk is collected, and a conduit feeding system.

It is to be understood that FIGS. 1–13 will be a type of continuous weighing mechanism which can be utilized in the present invention. Such a weighing (volumetric) mechanism can be employed in the present invention as pointed out in FIGS. 14–22.

Accordingly, in the drawings:

FIG. 1 illustrates more or less diagrammatically a typical milk conduit system of the general kind with which a weighing mechanism may be advantageously used;

FIG. 2 is a front elevation of a weighing mechanism per se;

FIG. 3 is a side elevation thereof;

FIG. 4 is an enlarged vertical section through the mechanism housing, taken on line 4—4 of FIG. 3, the supporting frame for the weighing mechanism being omitted from the view for clarity of illustration;

FIG. 5 is a top plan view of the baffle unit per se, portions of adjacent walls of the housing upper shell being shown in horizontal section;

FIG. 6 is an enlarged detail in side elevation of the rocker shaft shown in relation to certain openings in the walls of the housing (exhibited in section) wherein it is journaled for oscillatory movements;

FIG. 7 is a top elevation of the same shaft;

FIG. 8 is a bottom plan view of the housing upper shell together with the baffle unit positioned therein;

FIG. 9 is a top plan view of the housing lower shell together with the supporting frame therefor and the rocker tray therein;

FIG. 10 is a front elevation view of the weight control and counter device from which the dial and face plate are omitted to exhibit other parts therebehind;

FIG. 11 is a similar view with the counter escapement wheel removed to expose additional parts, the magnets being also omitted from the view;

FIG. 12 is a detail in section, taken on line 12—12 of FIG. 10;

FIG. 13 is a similar view, taken on line 13—13 FIG. 10;

FIG. 16 is a side elevation of a continuous weighing mechanism with the fluid flow indicating device and which shows one part of the present invention as opposed to the prior art shown in FIG. 3, without structural support;

FIG. 17 is a top view of the rocker shaft showing the type movement thereof in outline form, and FIG. 18 is a schematic of the circuitry of one control module used in conjunction with the fluid flow indicating device for establishing the milk output/feed input ratio;

FIG. 19 is a front elevation of a portion of the improved fluid movement control mechanism and showing specifically the delivery chute and housing attached to the side thereof;

FIG. 20 is a side elevation of the subject matter shown in FIG. 19;

FIG. 21 is a vertical section taken along lines 21—21 of the housing in FIG. 19 and showing a side elevation thereof;

FIG. 22 is a vertical section taken along lines 22—22 of FIG. 21 and is a front view of the housing with the cover removed therefrom;

FIG. 23 is a detail end vertical section drawn to an enlarged scale, taken on a midpoint vertical line of FIG. 19, showing the delivery of the wheel at the base of the chute by which to convey loose feed therefrom;

FIG. 24 is a detail of the feed delivery wheel in longitudinal section, taken on line 24—24 of FIG. 23 and drawn to an enlarged scale;

Figure 14:
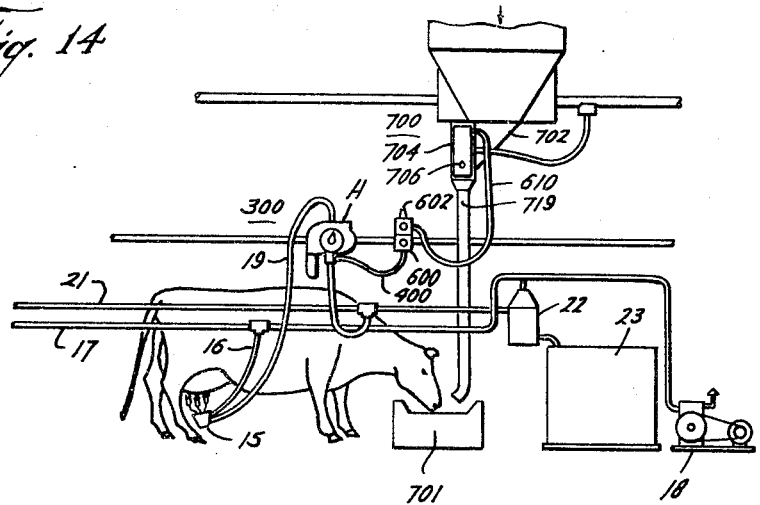
FIG. 14 illustrates more or less diagrammatically the improved conduit feeding system in combination with the flow rate indicating device and the continuous weighing mechanism.

and FIG. 25 is another embodiment of the feed delivery wheel wherein the blades thereof are at an acute angle with the wheel end plates.

DETAILED DESCRIPTION OF THE INVENTION

In FIG. 1, there is illustrated a closed conduit system through which a pulsating fluid is drawn in response to operation of a vacuum pump. Such a system is more or less common with present day milking machines. It comprises a claw 15 having teat cups applicable to the udder of a cow and provided with a flexible connection 16 leading to the air line 17 and a vacuum pump 18; also a flexible connection 19 leading to the housing H of the weighing mechanism which is interposed in the milk line 21 leading to a releaser 22 (for separating air from the milk) en route to the tank 23 wherein the accumulating milk is refrigerated and stored. Into and through such a conduit system which is closed and wherein a subatmospheric (minus) pressure is constantly maintained, the milk is drawn while pulsated in response to operation of the vacuum pump. To determine accurately the weight of the milk delivered at the source, i.e. the yield of the cow, while the milk is passing uninterruptedly to the storage tank, is the primary function of the weighing mechanism in the particular environment illustrated in FIG. 1.

The weighing mechanism enclosed within the housing H comprises two complementary bowl-shaped shells, one upper $u$ and one lower $l$, defining between them an elongated closed chamber through which the fluid material is continuously circulated while weighed. At the top of the upper shell $u$ is an inlet in the form of a nipple extending both inwardly of the chamber at 25 and outwardly thereof at 26 to facilitate connection therewith of the flexible pipe 19 (FIG. 1) leading to the conduit through which is flowed the fluid material to be weighed. An outlet nipple 27 provided at the bottom of the lower shell $l$ may be joined as by a flexible connection 28 (FIG. 1) to the conduit line 21 to deliver the weighed material to the point of its discharge, such as the tank 23. A sampler 29 interposed in the connection 28 retains a true proportionate sample of the fluid material convenient for testing. Along their meeting edges the two shells are provided with out-turned flanges 31 and 32 which interengage to form a tight joint there between. A supporting frame F for the housing H is also provided and, as shown, this comprises a bar of round cross section bent to provide two pairs of spaced vertical legs front and rear, 35 and 36, respectively, arranged to receive between them the upper and lower shells $u$ and $l$ of the housing. These four legs are notched at 37 at points where they may engage coacting notches 38 in the out-turned shell flanges 31 and 32 to secure the two shells closely and firmly together (FIG. 3). The upper end portions of the two rear legs 36 which are integral are formed into a down-turned hook 39 to facilitate attachment of the frame F and housing H to a bracket (not shown) affixed to the pipe stanchions or pipe lines which are commonly provided in milking parlors.

The upper shell u accommodates within itself a baffle unit 1 which, as shown, comprises an open-bottom baffle box 40 whose depending walls rest upon a baffle drain pan 41. At its top center the baffle box is apertured at 42 where it loosely surrounds the depending nipple 25 in spaced relation thereto. A baffle plate 43 which is confined within the depending walls of the baffle box 40 and rested loosely upon the baffle drain pan 41 is formed with openings 44 through which fluid material may drain into the pan. The baffle drain pan 41 itself is elongated in general conformity with the contour of the housing shells, and its bottom is pitched from opposite ends downwardly to its low point in the center which takes the form of a transversely extending shallow gutter wherein a plurality of aligned drain openings 45 are provided. The baffle unit b wherein the incoming fluid first enters serves as a receiving station wherein deaeration and depulsing of the material takes place. While halted at this station, the fluid body is quieted and relieved of any entrapped air whose presence would otherwise tend to prevent a smooth even flow thereof. This is important in order that the scale mechanism presently to be described may function accurately and speedily.

The fluid material upon leaving the baffle unit b descends through the drain openings 45 into a lower part of the housing chamber along a line which extends transversely thereof at the longitudinal center of the housing. To support the baffle unit in place, an elongated pin 46 is extended between opposite walls of the upper shell u and through like walls of the baffle box 40 and baffle pan 41 wherein suitable openings are provided for the purpose. Opposite ends of this pin are rested within sockets 47 formed on the inner faces of the upper shell u to provide support for the pin and its associated parts. One end portion of the pin (FIG. 4 and 8) is formed into a spring handle 48 which, when compressed, pushes the opposite pin end portions away from each other for secure engagement within the supporting sockets 47; this handle also facilitates manipulation of the pin whenever the baffle unit b is to be disassembled or reassembled for replacement within the housing. Manifestly each of the parts comprised in the baffle unit may be readily separated from the others for facile cleaning and sanitizing.

Within the lower shell 1 is a scale receiver r movable through a fixed path. In the embodiment shown, this receiver is in the form of an elongated tray mounted at its center point upon a rocker shaft 51 extending transversely of the housing. For the major portion of its length, through its center portion, the shaft 51 is flatted but opposite end portions are rounded out and formed into ovals or balls 52 and 53 of unequal diameters, each adapted for circular line engagement within aligned, closely surrounding, cylindrical bearings in the form of openings 54 which extend through the walls of the lower shell 1. The oval 52 is slightly larger in diameter than is the oval 53 and the shaft end portion proximate thereto is turned transversely of its axis of oscillation to provide a crank arm 55. The opposite shaft end proximate to the smaller oval 53 abuts a post 56 which depends from the flange 32 of the lower shell 1, the purpose being to provide an end thrust bearing therefor. In periods of non-operation the shaft may freely be removed from the lower shell 1 by an endwise movement in a direction away from the post 56; but with the vacuum pump in operation to draw milk through the conduit system a sufficient minus pressure is maintained within the two shells of the housing H whereby the higher external pressure exerts a force upon the larger oval 52 in excess of that upon the smaller oval 53 to hold the shaft in the endwise position shown in FIGS. 3 and 6 where it is engaged with the post 56.

A partition wall 57 traversing the rocker tray r centrally thereof is joined to side and bottom walls 58 and 59, respectively, thereby to define two fluid-tight compartments of identical capacity. The base of the partition wall 57 is widened to accommodate for its length a slot 60 open along its bottom to rest upon the flatted portion of the shaft 51 with whose opposite faces it is engaged nonrotatably. The cylindrical end portions of this shaft are disposed outwardly of the tray side walls 58 and serve as means to prevent shifting of the tray upon the shaft endwise thereof. The shaft-tray assembly is exactly balanced but with capacity for rocking movement between two fixed positions in either of which the bottom of the tray compartment which is down will be inclined downwardly, to rapidly spill through its open end the fluid load that has previously been deposited therein.

FIG. 4 illustrates the receiver r in discharge position for the compartment at its lower (left) end. While so positioned, the partition wall 57 is also inclined to the left so that its upper edge is disposed to the left of the drain openings 45 in the gutter of the baffle drain pan 41 thereabove; material flowing by gravity through these openings will accordingly be discharged into the tray upper compartment (to the right as shown in FIG. 4). Filling of this upper compartment starts after emptying of the lower compartment to the left has been well under way. All the fluid material in the lower (left) compartment will, therefore, be discharged therefrom before any considerable filling of the upper (right) compartment has taken place. By providing drain openings 45 of an aggregate area requisite for proper regulation of the flow of material passing therethrough, a complete emptying of the discharging (down) compartment can be assured before a predetermined weight of the material can accumulate within the receiving (upper) compartment. By this means each filling of the upper compartment will proceed to the point of depositing therein material having a predetermined weight so that it is possible to ascertain, with the aid of an accumidating counter device C (hereinafter described), the exact quantity of material, by weight, which has flowed through the gutter openings 45 to move the receiver r through its cycles during the entire period of operation.

With continued discharge of material through the gutter openings 45, the two-compartment scale receiver r is repeatedly operated through its cycle to move between two positions in one of which the filled compartment is emptied and the other filled (but with very little time loss), and vice versa. However, the factors of speed and of accuracy must be constantly reckoned with, and without the provision of certain means to fix the time requisite for movement of the receiver r between its two positions, the weighing mechanism would probably fall short of meeting many industrial requirements. The provision of such control means will now be described.

Affixed to the front legs 35 of the frame F is a mounting plate 62, which carries a weight control and counter device C. This plate also supports a U-shaped bracket 63 whereon is pivotally mounted at 64 a magnet arm 65 in the general form of a strip. One end portion 66 of this arm is laterally turned to extend rearwardly through an arcuate slot 67 that is formed in the plate 62; the end 66 so projected through the mounting plate is bifurcated at 68 to receive the crank arm 55 of the receiver shaft whereby to transmit oscillatory movements thereto. The opposite end portion 69 of the magnet arm 65 is twisted through 90° to present its flat faces in confronting relation to a pair of spaced permanent magnets 71 and 72, each of U-shape in cross section (FIG. 13) to accommodate a fixed plastic core. Through these cores 73 and 74 are extended traversing adjusting screws 75 and 76 which are rotatably supported in brackets 77 and 78, respectively. The axes of the screws 75 and 76 diverge from a point lying in a vertical plane which approximately intersects the pivotal axis 64 of the magnet arm 65, and at a point somewhat therebelow. By this arrangement the end portion 69 of the magnet arm is free to swing between the two magnets through a movement range that is determined by the brackets 77 and 78 which serve also as stops therefor. Angled spring strips 79 and 80 extending parallel with the adjusting screws 75 and 76 maintain a pressure engagement with the two magnets 71 and 72 in all adjusted positions thereof to prevent any loose play upon their mountings and assure against any deviation from the exact positions wherein they are adjusted.

FIG. 10 shows one position of adjustment wherein the brackets stop the end 69 of the magnet arm at points slightly spaced from the two magnets; by adjusting the screws 75 and 76 each magnet may be raised or lowered, and in consequence brought further toward or away from the magnet arm end 69 to thereby vary the air gap therebetween. It is possible, therefore, to increase or decrease the effective magnetic forces operable upon the magnet arm end 69 to influence its oscillations between the two bracket stops 77 and 78. This is important because this adjustment is the control over the weighing properties of the mechanism herein described.

The counter device C may be of any approved type. The one here illustrated is equipped with a circular dial 81 around which a pointer 82 is moved to register, by weight, the quantity of fluid material that is passed through the weighing mechanism (FIG. 2). This counter device comprises a toothed escapement wheel 83 certain of whose teeth are alternately engaged by a pair of pins 84 and 85 extending from a pawl 86 at the end of a shaft 87 which is pivotally supported by the mounting plate 62 and bracket 63 (FIGS. 10–12). Oscillatory movements are transmitted from the magnet arm 65 wherein is a slot 88 engageable by a pin 89 which is extended therethrough from the pawl 86 for operation thereof. The escapement wheel 83 is frictionally secured upon a shaft 90 which is rotatably supported upon the bracket 63 and upon a second outer bracket 91 which is carried upon the mounting plate 62 (FIGS. 10 and 12). At its outer end the shaft 90 carries fast the pointer 82 to advance the same around the dial 81. This pointer 82 may be manually reset to zero whenever desired, the escapement wheel then standing still while the shaft 90 is rotated to permit of such adjustment. By the means described, each movement of the receiver r transmits motion to the escapement wheel 83 to rotate it through the distance of one tooth and advance the pointer accordingly. The operating parts of the counter device C may be enclosed within a suitable case as is commonly done with such instruments.

The particular materials used for the different parts of the weighing mechanism should be carefully chosen with due regard to the nature and characteristics of the fluids to be circulated therethrough. For example, if milk be the fluid, then the important considerations of non-toxicity and sanitation will rule out many materials as unfit. Stainless steel is generally approved in this industry, and also certain plastic materials. For lightness, cleanability, and general serviceability the plastic known as methyl methacrylator polymer is entirely satisfactory for the two shells of the housing H, the baffle unit b and the receiver r. The property of lightness in relation to weight which inheres in such a plastic makes it especially desireable for the receiver with a view to minimizing its weight and consequent inertia when in operation. Inasmuch as this material is somewhat flexible, the walls of the housing H (if then, as is desirable for purposes of weight reduction) will undergo flexure in response to operation of the vacuum pump, thereby tending to misalign the axes of the two cylindrical bearings 54.

Any such flexure would tend to create a binding pressure on the shaft 51 whose end portions are journaled for oscillatory movements therein. Any such effect is obviated, however, by rounding outwardly the shaft end portions into the two ovals or balls 52 and 53 which maintain a continuous circular line engagement within their bearings even though the housing walls may undergo flexure during periods of operation while maintaining their close fit within the supporting bearings therefor. For the baffle unit pin 46 and receiver shaft 51, stainless steel is an approved material where milk is the fluid to be weighed. Manifestly, where other and different fluids are to be passed through the weighing mechanism, there is a wide choice of materials available for the housing and all operating parts therewithin, provided only that they meet all the requirements, atmospheric and otherwise, imposed by the special conditions encountered in their use.

To attain a high degree of accuracy in the weighing operation, it is important that the factor of inertia in all movements of the scale receiver r be held to the minimum, and also that adjustable means, additional to gravity, be provided to accelerate and control all movements of the receiver between its receiving and discharging positions. The very light weight of the balanced scale receiver is relied upon to cancel out most of the inertia, and the provision of the pair of co-acting magnetic means 69 and 71 (or 72) serves effectively to speed the movements of the receiver between its two positions. The influence of the coacting magnetic means may readily be varied by proper adjustment of the adjusting screws 75 and 76, one or both of them, to widen or narrow the air gap between them thereby affecting the time interval required for operation of the receiver r through its cycle. Each movement of the receiver r is controlled by the magnets 71 and 72 and therefore the subsequent weight of that measure of fluid. In effect, the weight of the fluid in the one compartment of the receiver r is suspended by the magnetic attraction of the magnet 71 (or 72) for magnet arm 69 through the interconnected mechanical linkage previously described. Since one of the inherent properties of a permanent magnet is a rapid and increasing reduction of magnetic attraction with only a slight increase in air gap, a relatively slight movement of the magnet arm 69 by the accumulated fluid reaching the predetermined weight supportable by the magnetic attraction, for all practical purposes leaves the filled receiver compartment unsupported.

While the movement of the receiver r is relatively rapid, it is accelerated through its arc of travel since the movement of fluid toward the end of the compartment is continually moving the center of gravity of the contained fluid toward the discharge end of the receiver compartment. At the end of travel the fluid will completely drain from the receiver r with the opposing magnet then supporting the opposite compartment. It is the air gap between the magnet arm that determines the weight of the fluid contained in each compartment, and therefore the increase or decrease of that air gap, by adjusting movement of the screws 75 and 76, is the means of calibration to the desired weight. In practice, each movement of the receiver which is of a relatively short range starts off very fast and proceeds at an accelerating pace so that the fluid material entering the baffle means b of the housing is enabled to maintain a continuous flow therefrom into and out of the receiver r and on through the conduit system, all without interruption or variation in its flow rate while undergoing a concurrent weighing operation.

The frame F can be made of any suitable material, however, it is desirably produced from an aluminum (or aluminum alloy) bar which is readily fashioned into the form herein described. Its front and rear legs have sufficient spring properties to securely hold the two housing shells u and l in assembled relation and, when spread further apart slightly, to release the shells for disassembly of all working parts of the weighing mechanism. The weight control and counter device C which is operatively connected to the receiver shaft crank arm 55 by the bifureated slot 68 of the magnet arm 65 will readily disengage therefrom when the frame front legs 35 are pulled outwardly to release the housing H for removal from the frame F; conversely, when the lower shell l, complete with its receiver r in place, is reassembled with the upper shell u within the frame, the shaft crank arm 55 is free to reenter the bifureation 68 of the magnet arm 65, thereby restoring the operative connection therewith, all with a minimum of time and effort. This is important inasmuch as it facilitates the operation of cleaning the various working parts, of the weighing mechanism which, in many cases, is required, at least, periodically. The overall dimensions of the weighing mechanism are small, due largely to the simplicity and fewness of its several components and to the materials selected for the construction thereof, and its ready portability is attested by the fact that the weight of the entire mechanism complete, as commercially produced for the dairy industry, may be held to less than 5 lbs.

In summary then, the foregoing description sets forth one embodiment which provides a means which permits a weighing mechanism (which is used in association with the herein described fluid flow indicating device) to operate continuously upon a fluid stream of indefinite length, moving at even speed or otherwise, while contained in a conduit system, for conditioning the fluid, when necessary, to assure an even and quiet flow thereof into and out of a gravity operated scale receiver, and for exercising close control over the quantity, by weight, of fluid that is accepted into the receiver for each operation thereof, all without any substantial deviation from the normal flow rate of the fluid moving through the (milk) conduit system. Because of the several features herein disclosed this weighing mechanism which is compact, light and inexpensive is able to meet exacting requirements in numerous industries and provide a high degree of accuracy in the weighing of many different fluids.

It is to be understood that any type of weighing mechanism (including such mechanism which measures the fluid flow in volumetric fashion) including the foregoing described mechanism which employs a shaft (51) and crank arm (55) functioning in the capacity described herein can be used in one facet of the present invention.

In conjunction with FIGS. 1–13, these represent to some degree the prior art and are illustrative of a type of weighing mechanism which can be utilized in combination with the fluid flow indicating device, both of which in combination constitute one facet of the present invention and both of which in combination with the milk fluid conduit system and conduit feeding system constitute other facets of the present invention. As previously mentioned, other weighing mechanisms can be utilized herein and even improvements to the above described mechanism such as those set forth in U.S. Pat. No. 2,917,926 may be employed.

Referring now to FIG. 14, this FIGURE shows the present invention incorporated into a milk fluid conduit system and a conduit feeding system. The reference numbers of less than 91 are the same as those indicated in FIGS. 1–13. Thus, there is shown in FIG. 14 a cow being milked with milking machine 15 and fitted with line 16 which employs a vacuum thereon through line 17 via containers 22 and 23 and vacuum pump 18. The continuous weighing mechanism H is shown being fed through conduit 19. The weighing mechanism H has been modified by the incorporation of the fluid flow indicating device 300 positioned on and beneath the rocker shaft 55 (FIG. 16) in order to accurately detect the flow of milk through said mechanism (i.e. the milk output) and transmit a signal through wiring 400 to control box 600.

The control box 600 contains a "mother board" (hereinafter described) having detachably connected thereto a "Flo-Sensor" control module which activates light 602 in the event of termination of fluid flow, i.e. an indication that the cow is "milked-out." This facet is more specifically described in my copending patent application, Ser. No. 563,093, entitled "Improved Continuous Weighing Mechanism For Fluids" filed Mar. 28, 1975 and which is incorporated herein, in toto, by reference.

Referring to the same signal which is transmitted through connector cord 400 to control box (or center) 600, this signal also is concurrently received (in parallel) by a second control module designated a "Ratio Control Module" which activates, through a suitable connector cord 610, the motor for driving the feed delivery wheel in the fluid movement control mechanism (hereinafter described). Thus, in one specific facet of the present invention, the single or sole signal from the magnetic field proximity switch (when activated) in turn jointly activates in parallel (through the mother board) the above described two control modules.

The terms "Ratio Control Module" and "fluid/feed ratio" are used interchangeably herein.

Figure 15:
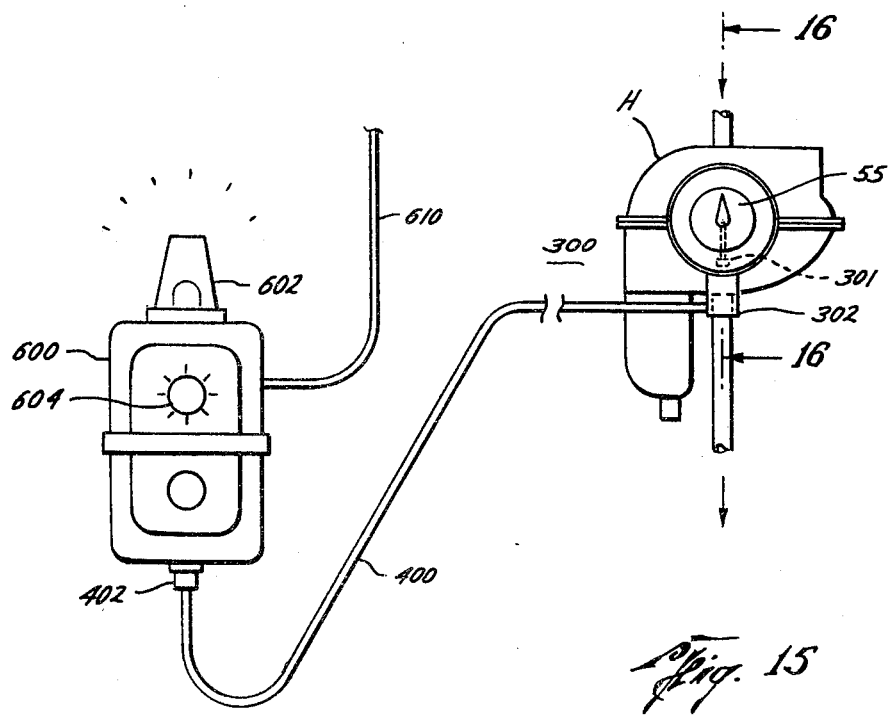
FIG. 15 is an enlarged detail of an improved weighing mechanism and which is shown connected to a housing containing at least two control modules (herein defined) and an indicating light.

FIG. 15 more specifically shows an enlargement of a portion of the fluid flow indicating device which comprises a magnet 301 detachably connected to the lower portion of shaft 55 which is, in turn, in electromagnetic relationship with switch 302 which is attached to said weighing mechanism. It is to be understood that while the attachment of switch 302 to said mechanism, the frame F or counter device C (all as shown herein) can be suitably adapted, other means for such attachment may be employed and are thus within the scope of the present invention.

Referring to FIGS. 15, 16 and 17, there is shown housing H provided with inlet 26, outlet 27, counter device C, and shaft 55. Detachably connected to the lower portion of shaft 55 is magnet 301 which in turn is positioned in electromagnetic relationship with switch 302, such as a magnetic proximity switch (e.g. a reed switch). Switch 302 is, in general, located beneath magnet 301 and so positioned to be within and below the arcuate path of magnet 301 (FIG. 17). Switch 302, in turn, is detachably connected to either the counter device C, the frame F, the housing H or any combination of the three. Preferably, the switch 302 per se is detachably connected to an L shaped frame (not shown) which, in turn, is connected to the counter device C and the housing frame F, for example, by metal screws. Switch 302 houses contact points 304 and 306 (shown in "open" position) which are respectively connected to wires 308 and 310 which terminate at plug 312. This plug 312 provides an electrical connection with said wires 308 and 310 with the conductors contained in the connector cord 400 (FIG. 15) which terminates with plug 402 (FIG. 15) which is, in general, remotely disposed from switch 302.

Referring to FIG. 18, there is shown a schematic of the circuitry used in conjunction with the fluid flow indicating device which energizes the motor in the conduit feeding system 700. This circuitry preferably is a solid state circuit board which is referred to herein, in general, as a "control module" 800 (or "ratio control module") (fluid/feed or milk/grain control module).

Referring again to FIG. 18 and the control module 800, this comprises an input circuit 802 which receives a signal from switch 302. In turn, a "flow monitoring timer" 804 receives the signal through a series of resistors and capacitors from input circuit 802. It is readily apparent from the schematic in FIG. 18 that suitable capacitors and resistors and electrically conductive means are provided throughout the system. The system is designed to receive in the flow monitoring timer 804 electrical impulses with a certain period of time between each impulse input. Specifically, each time the rocker shaft 55 containing magnet 301 rotates in an arcuate path over the surface of switch 302, the switch 302 is activated and the contact points are in a closed position (touching each other) and thus there is initiated an electrical impulse to the control module 800 wherein timer 804 registers such signal.

In conjunction with control module 800, the circuitry is so preset, but adjustable through the potentiometric circuit section 806, that upon receipt of a signal from switch 302 and monitored by timer 804, an electrical signal energizes an optical coupler 808 permitting a pilot voltage VT to be impressed through to a (thyristor) triac 810 and which as a result thereof activates the alternating current power lines 812 and 814, through connector cord 610, thus energizing the motor 720 in the conduit feeding system (see FIG. 21).

In conjunction with the potentiometric circuit section 806, this is a potentiometer which is provided with a shaft and a flat to match a slip coupling (not shown) on the cover of control box 600. In this manner, a variable rate can be selected by rotation of the upper dial 604 on the control box cover to determine the automatic milk/grain (fluid/feed) ratio given the cow (FIG. 15).

Referring to FIGS. 14, 19, 20 and 23, the conduit feeding system 700 is shown in general. Specifically affixed to one side of housing 704 is a feed chute 702 having an angular wall 710 extending from a relatively low point thereon, both upwardly and outwardly, to a point about even with the top of the housing, the chute thus formed being closed at opposite ends by triangular walls. As herein shown, the electro-mechanical apparatus such as motor 720 is carried with the vertically elongated housing 704 to the front face of which is affixed a removable cover. This cover is also provided with a hole 706 which permits a light 707 to extend therethrough in order to ascertain if the motor 720 positioned therein is in operation.

A generally vertical partition 750 within the chute 702, extending downwardly and toward its angular wall 710 and then horizontally away therefrom at 752, cooperates in defining a narrowing feed supply space terminating in an elongated throat 754 through which feed is gravity impelled when drawn therethrough and into an elongated, segmentally compartmented, delivery wheel W which is rotatably mounted at the base of the chute below the horizontal wall 752 therein. Below the delivery wheel W is an adaptor fitting 716 joined to the walls of the chute to provide therebelow neck 718 to which may be connected the upper end of a delivery spout 719 (see FIG. 14), extending downwardly to discharge feed therefrom into a pan 701 arranged conveniently for the cow when occupying a stall in the conventional milking parlor. The housing 704 and chute 702 are desirably supported from the ceiling of the milking parlor, in position for its chute to receive a constant feed supply, as by gravity from a bin or otherwise from a conveyor.

Extending axially through the hub 760 is a shaft 766, in driving connection therewith, having opposite end portions journaled for rotation within bearings 768 that are carried by opposite walls of the lower portion of chute 702. In order to prevent leakage of feed past the wheel end walls 763, flanged arcuate moldings 770 may be affixed to the proximate chute walls 754 in position to closely overlie the peripheries of the end walls 763 through a substantial distance in the upper end portions (see FIG. 23).

The chute wall 754 which is vertically disposed immediately below the angular wall 710 and oppositely of the delivery wheel W is cut away to provide elongated access opening 711 of substantial area. This opening is normally closed by cover 712 of arcuate contour corresponding to that of the wheel end walls 763, so as to occupy a position closely adjacent the wheel while remaining free of engagement therewith. The cover 712 is desirably held in this closed position as by a spring hinge mounting 714 on the chute, permitting it to be swung out and away from the delivery wheel W to afford ready access thereto for cleaning or other purposes. A sight glass window 708 in one of the end walls of the chute affords a view of conditions interiorly thereof, so that an attendant may tell at a glance whether feed is moving properly therethrough, in addition to the use of light 707 which indicates operation of motor 720.

Referring to FIGS. 21 and 22, there is shown respectively in side and front views more specifically housing 704 containing motor 720. Motor 720 is a single compact unit having a direct drive and gear reduction all in one unit. The drive shaft 766 from the rotatable wheel W is detachably connected to said gear motor 720 with a coupling 726. Also contained within housing 704, is a connector board 730 having contact points 732 located thereon and which provides appropriate and suitable connecting points for incoming connector cord 610 from the control box 600. Furthermore, connector board 730 is also suitably adapted through switch 740 to manually activate motor 720 when the milking parlor attendant so desires to do so. Specifically shown protruding through hole 706 in the cover plate of housing 704 is a light which functions to indicate when motor 720 is in operation.

Referring to FIGS. 23 and 24, the delivery wheel W comprises a hub 760 from which uniformly spaced walls 762 are radially extended, together with circular end walls 763 joined to the radial walls to provide therewith a plurality of segmental compartments of uniform capacity. The outer edge of each radial wall 762 carries a lip 764 facing forwardly with respect to the direction of the wheel movement as indicated by the arrow in FIG. 23, the purpose being to facilitate its movement into the body of the material to be scooped into the proximate wheel compartment for conveyance thereby to a position for gravity discharge therefrom.

In conjunction with the delivery wheel W, the specific configuration of the spaced walls 762 is not critical and such walls can be of any configuration as long as the desired end result, i.e. feed delivery, is achieved. Thus with this in mind, it is within the scope of the present invention that the spaced walls of said wheel W may be angular (instead of perpendicular) with respect to the wheel end walls 763 and as shown in FIG. 25 by angular walls 762a.

In operating the present invention feed mechanism, some of the unusual conditions encountered, and the means provided to cope with them may best be understood by considering a typical installation in a milking parlor. Among other factors to be reckoned with are the cow's milk production and the rate thereof and the ratio of such production to the feed consumed. While there is some variation in these figures, an average for a normal cow may be taken for purposes of illustration here.

A production of 23 lbs. would be normal. The flow through the milk line 21 is periodically interrupted by the rocking tray r from which the milk is dumped in increments of about ¼ lb. each, to the number of about 92 per milking. This is at the rate of about 4 lbs. per minute. The dumping of each ¼ lb. from the rocking tray generates an electrical impulse through the fluid flow indicating device (herein described) which initiates a concurrent delivery of feed to the cow in an amount which is proper and best for her maintenance in good milk-producing condition. What amount is proper can be determined by individual tests in conjunction with known statistics based upon scientific tests. A simple dial may indicate the proper setting to meet all conditions, such as variations in feed density, time of year, pasturage, available feeds, etc. Such a dial may comprise the adjustable dial 604 (which controls the potentiometer herein described) by which to vary the ratio of the milk output to the amount of feed which will be advanced by the delivery wheel with each operation thereof. Setting of this dial 604 controls the constant ratio of feed to milk production. In this way, a cow producing, e.g. 40 lbs. of milk, will deservedly receive approximately twice as much feed as one producing half that amount.

The feed delivery wheel W, as shown, is provided with six compartments, each angled at 60° and with capacity for about 2 ozs. of feed. Its rotative movement is in response to the circuitry design of ratio control module 800. By different settings of dial 604 this ratio is variable. This assures an infinitely variable ratio of feed delivery per increment of milk dumped from the rocking tray 98, through a range equaling approximately a 2:1 to 8:1 ratio of milk production to feed. Control of the amount of feed delivered concurrently to the producing cow is attained by use of the fluid flow indicating device, such as that herein disclosed, which is periodically energized in response to impulses consequent upon advance of uniform increments of milk through the conduit system therefor. Advances of feed, in increments corresponding to a selected degree in number to those of the milk, also take place concurrently, but the amount of feed so delivered is variable according to the setting of dial 604.

Full discharge of feed from the wheel compartment which it occupies may require a rotative movement of the wheel through a substantial distance, otherwise its advance will be short of that needed for gravity discharge of the feed therefrom. If the dial 604 setting be such that the wheel rotates but, say 15° each time, then several successive cyclic operations will be needed before gravity discharge of feed can take place. While there may be wide variations in the uniform amounts of feed delivered with each cyclic operation, the total amount at the end of the milk production period can be accurately predetermined by the setting given to dial 604.

The present invention utilizes effectively the gravity-induced electrical impulses which are generated by the tray r in response to each imbalance-shifting and magnet rocking movement thereof. Each such impulse is transmitted electrically to the control module 800 and provides a means interconnecting the tray and feed delivery mechanism for controlled operation of the latter. By this arrangement, concurrent operation of the tray and feed mechanism are assured, but with provision for regulating operation of the latter to deliver feed in an amount which is selectively proportionate to that of the fluid material whose conversion into separated increments is the source of power impulses linking this feed delivery mechanism together for inter-related operations in the manner herein disclosed.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A fluid flow indicating device for use with a first conduit system wherein a fluid material is moved and is weighed by a continuous weighing mechanism provided with a housing and support frame therefor, and a fluid receiver mounted upon a rocker shaft, said receiver and a portion of said rocker shaft contained within said housing, and comprising (a) a magnet which is adapted to be detachably connected to said rocker shaft on that portion thereof which is outside said housing; (b) an electromechanical switch which is adapted to be mounted on said frame, said switch being in electromagnetic relationship with said magnet so that movement of said magnet can activate said switch; (c) a control module containing input and output circuits, disposed remotely from said switch and interconnected therewith by suitable electrically conductive means, said control module adapted to receive a signal from said switch through said input circuit and upon preset circuitry conditions, activate an outside electrical power supply through the said output circuit and thereby energize a motor which drives a compartmented feed delivery wheel positioned in a second conduit system, said output circuit and said motor being interconnected therewith by suitable electrically conductive means, said control module consisting of a solid state timing device which comprises a timer integrated circuit, a potentiometric section circuit which is adapted to change the length of time of the energization of said motor according to the frequency of the signal from said switch, and suitable electrically conductive means therebetween.

2. The apparatus as set forth in claim 1 wherein there is also included a second housing which function as a control center and which is adapted to detachably contain said control module.

3. The apparatus as set forth in claim 2 wheerein said second housing is provided with means to contain a second control module which also concurrently receives said signal from said switch, and which is connected to said electrical power supply, which also activates a light acccording to the preset circuitry conditions of said second control module.

4. The apparatus as set forth in claim 1 wherein said motor is a direct drive motor provided with a gear reducer.

5. A fluid flow indicating device for use with a first conduit system wherrein a fluid material is moved and is weighed by a continuous weighing mechanism provided with a housing and support frame therefor, and a fluid receiver mounted upon a rocker shaft, said receiver and a portion of said rocker shaft contained within said housing, and comprising (a) a magnet which is adapted to be detachably connected to said rocker shaft on that portion thereof which is outside said housing; (b) an electromechanical switch which is adapted to be mounted on said frame, said switch being in electromagnetic relationship with said magnet so that movement of said magnet can activate said switch; (c) a control module containing input and output circuits, disposed remotely from said switch and interconnected therewith by suitable electrically conductive means, said control module adapted to receive a signal from said switch through said input circuit and upon preset circuitry conditions, activate an outside elecrical power supply through the said output circuit and thereby energize a motor which drives a compartmented feed delivery wheel positioned in a second conduit system, said output circuit and said motor being interconnected therewith by suitable electrically conductive means, said control module comprising (a) an integrated circuit timer for receiving an incoming electrical signal from said switch through said input circuit; (b) a control transistor which receives a signal from said timer integrated circuit; (c) an optical coupler which receives a signal from said control transistor pursuant to preset circuitry conditions and which is energized thereby; and (d) a triac which is operative via a pilot voltage through the energized optical coupler and which triac in turn activates an electrical power supply through the output circuit.

6. Apparatus for feeding loose material through a chute having a throat adjacent a discharge opening comprising a compartmented wheel rotatably mounted within the throat for receiving in one or more of its compartments material to be conveyed toward the chute opening for discharge therefrom for consumption by an animal, a motor exteriorly of the chute and operatively connected with said wheel, and a fluid flow indicating device remotely deposed from said motor and interconnected therewith by suitable electrically conductive means, said device being adapted to monitor the fluid output of an animal consuming said material and through preset circuitry conditions in said device, energizing said motor for rotation of siad wheel; said fluid flow indicating device is used with a first conduit system wherein a fluid material is moved and is weighed by a continuous weighing mechanism provided with a housing and support frame therefor, and a fluid receiver mounted upon a rocker shaft, said receiver and a portion of said rocker shaft contained within said housing, and which device comprises (a) a magnet which is adapted to be detachably connected to said rocker shaft on that portion thereof which is outside said housing; (b) an electromechanical switch which is adapted to be mounted on said frame, said switch being in electromagnetic relationship with said magnet so that movement of said magnet can activate said switch; (c) a control module containing input and output circuits, disposed remotely from said switch and interconnected therewith by suitable electrically conductive means, said control module adapted to receive a signal from said switch through said input circuit and upon preset circuitry conditions, activate an outside electrical power supply through the said output circuit and thereby energize said motor, said control module consisting of a solid state timing device which comprises a timer integrated circuit, a potentiometric section circuit which is adapted to change the length of time of the energization of said motor according to the frequency of the signal from said switch, and suitable electrically conductive means therebetween.

7. The apparatus as set forth in claim 6 wherein said motor is enclosed within a housing.

8. The apparatus as set forth in claim 6 wherein there is also included a second housing which function as a control center and which is adapted to detachably contain said control module.

9. The apparatus as set forth in claim 8 wherein said second housing is provided with means to contain a second control module which also concurrently receives said signal from said switch, and which is connected to said electrical power supply, which activates a light according to the preset circuitry conditions of said second control module.

10. The apparatus as set forth in claim 6 wherein in the control module the integrated circuit timer is adapted to receive an incoming electrical signal from said switch through said input circuit; and said module further comprises a control transistor which receives a signal from said timer integrated circuit; an optical coupler which receives a signal from said control transistor pursuant to preset circuitry conditions and which is energized thereby; and a triac which is operative via a pilot voltage through the energized optical coupler and which triac in turn activates the electrical power supply through the output circuit.

11. The apparatus as set forth in claim 10 wherein said motor is a direct drive motor provided with a gear reducer.

12. A conduit feeding system comprising (a) a chute for containing loose feeding material passing therethrough to a discharge opening; (b) a compartmented delivery wheel positioned within said chute for receiving said material into one or more of its compartments to be conveyed thereby toward the discharge opening; (c) a motor in direct driving connection with said delivery wheel; (d) a fluid flow indicating device provided for use with a second conduit system wherein a fluid material is moved and is weighed by a continuous weighing mechanism which is provided with a housing and support frame therefor, and a fluid receiver mounted upon a rocker shaft, said receiver and a portion of said rocker shaft contained within said housing, and said device comprises (i) a magnet which is adapted to be detachably connected to said rocker shaft on that portion thereof which is outside said housing; (ii) an electromechanical switch which is adapted to be mounted on said frame, said switch being in electromagnetic relationship with said magnet so that movement of said magnet can activate said switch; and (iii) a control module containing input and output circuits, disposed remotely from said switch and interconnected therewith by suitable electrically conductive means, said control module adapted to receive a signal from said switch through said input circuit and upon preset circuitry conditions, activate an outside electical power supply through the said output circuit and thereby energize said motor for rotation of said wheel, said control module consisting of a solid state timing device which comprises a timer integrated circuit, a potentiometric section circuit which is adapted to change the length of time of the energization of said motor according to the frequency of the signal from said switch, and suitable electrically conductive means therebetween; and (e) suitable electrically conductive means between said device and said motor.

13. The system as set forth in claim 12 wherein there is also included a second housing which functions as a control center and which is adapted to detachably contain said control module.

14. The system as set forth in claim 13 wherein said second housing is provided with means to contain a second control module which also concurrently receives said signal from said switch, and which is connected to said electrical power supply, which also activates a light according to the preset circuitry conditions of said second control module.

15. The system as set forth in claim 12 wherein the control module comprises (a) an integrated circuit timer for receiving an incoming electrical signal from said switch through said input circuit; (b) a control transistor which receives a signal from said timer integrated circuit; (c) an optical coupler which receives a signal form said control transistor pursuant to preset circuitry conditions and which is energized thereby; and (d) a triac which is operative via a pilot voltage through the energized optical coupler and which triac in turn activates an electrical power supply through the output circuit.

16. The system as set forth in claim 12 wherein said motor is a direct drive motor provided with a gear reducer.

17. The system as set forth in claim 16 wherein said motor is enclosed within a housing.

18. The system as set forth in claim 17 wherein the continuous weighing mechanism for fluids moving through said second conduit comprises a housing, supported by a frame, providing a chamber having aligned cylindrical bearings carried by opposite walls thereof and formed at its top and bottom respectively, with an inlet and an outlet, a receiver rockable through a fixed circular path and adapted in one predetermined position to receive fluid from the inlet and, when in a second predetermined position, to discharge the fluid by gravity for drainage through the outlet, a rotatable shaft whereon the receiver is mounted fast for said rocking movement with the turning of the shaft, the shaft and receiver being formed cooperatively effecting said fast mounting while permitting the receiver to be freely separable from the shaft by a radial movement relative thereto, the shaft having end portions extended into the cylindrical bearings and having end portions extended into the cylindrical bearings and having the portions lying in the bearings outwardly rounded from and closely journaled in and engaging in annular line contact with the bearings for free rotation therein under conditions of varying distortion and relative movement of the areas of the housing walls having the bearings therein, and a counter device connected with the shaft for operation thereby with each rotary movement thereof.

19. The combination of a milk conduit system, originating with a producing cow, wherein said system includes a movable means for receiving milk flowing in a variable stream therethrough and converting such stream into uniform increments thereof for processional advance therethrough, and a feed conduit system in which a feeder, mounted for movement in a fixed path and having operating means therefor, is operable to processionally advance variable amounts of feed therethrough in uniform increments, and means responsive to movement of said movable means in its conversion of the streeam into each increment of milk within its conduit system to energize the feeder operating means whereby to advance an increment of the feed within the conduit system therefor, said responsive means comprising a fluid flow indicating device for use with said movable means provided with a housing and support frame therefor, and a fluid receiver mounted upon a rocker shaft, said receiver and a portion of said rocker shaft contained within said housing, and comprising (a) a magnet which is adapted to be detachably connected to said rocker shaft on that portion thereof which is outside said housing; (b) an electromechanical switch which is adapted to be mounted on said frame, said switch being in electromagnetic relationship with said magnet so that movement of said magnet can activate said switch; (c) a control module containing input and output circuits, disposed remotely from said switch and interconnected therewith by suitable electrically conductive means, said control module adapted to receive a signal from said switch through said input circuit and upon preset circuitry conditions, activate an outside electrical power supply through the said output circuit and thereby energize a motor which drives a compartmented feed delivery wheel positioned in said feeder, said output circuit and said motor being interconnected therewith by suitable electrically conductive means; said control module consisting of a solid state timing device which comprises a timer integrated circuit, a potentiometric section circuit which is adapted to change the length of time of the energization of said motor according to the frequency of the signal from said switch, and suitable electrically conductive means therebetween.

20. An apparatus for delivering to a milk producing cow an amount of feed directly proportionate to her output of milk, which apparatus comprises the combination with a pivotally supported gravity oscillated weighing tray having two compartments for alternately receiving milk directly from the producing cow, said tray compartments alternately dumping under gravitational action equal volumes by weight of milk as it is received, a feed delivering system including a feed supply means including a conduit for delivering feed to a cow for consumption concurrently with her delivery of milk to the weighing tray, rotary means, including a motor, forming a part of said supply means and constructed to pass into the conduit a predetermined quantity of feed upon a predetermined degree of rotation, and a fluid flow indicating device, including solid state electrical circuitry, for monitoring the oscillation of said weighing tray and, according to preset circuitry conditions therein, energize said motor thereby to supply said feed from said rotary means, said fluid flow indicating device for use with said tray provided with a housing and support frame therefor, and said tray mounted upon a rocker shaft, said tray and a portion of said rocker shaft contained within said housing, and said fluid flow indicating device comprising (a) a magnet which is adapted to be detachably connected to said rocker shaft on that portion thereof which is outside said housing; (b) an electromechanical switch which is adapted to be mounted on said frame, said switch being in electromagnetic relationship with said magnet so that movement of said magnet can activate said switch; (c) a control module containing input and output circuits, disposed remotely from said switch and interconnected therewith by suitable electrically conductive means, said control module adapted to receive a signal from said switch through said input circuit and upon preset circuitry conditions, activate an outside electrical power supply through the said output circuit and thereby energize said motor, said output circuit and said motor being interconnected therewith by suitable electrically conductive means, said control module consisting of a solid state timing device which comprises a timer integrated circuit, a potentiometric section circuit which is adapted to change the length of time of the energization of said motor according to the frequency of the signal from said switch, and suitable electrically conductive means therebetween.

* * * * *